(12) United States Patent
Tang et al.

(10) Patent No.: US 10,992,364 B2
(45) Date of Patent: Apr. 27, 2021

(54) SYSTEMS AND METHODS FOR ADAPTIVE BEAMFORMING MANAGEMENT

(71) Applicant: Verizon Patent and Licensing Inc., Arlington, VA (US)

(72) Inventors: Xin Tang, Livingston, NJ (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/251,448

(22) Filed: Jan. 18, 2019

(65) Prior Publication Data
US 2020/0235800 A1 Jul. 23, 2020

(51) Int. Cl.
*H04B 7/06* (2006.01)
*H04W 4/02* (2018.01)
*H04B 7/0408* (2017.01)
*H04B 7/0413* (2017.01)

(52) U.S. Cl.
CPC ........ *H04B 7/0695* (2013.01); *H04B 7/0408* (2013.01); *H04B 7/0617* (2013.01); *H04W 4/027* (2013.01); *H04B 7/0413* (2013.01)

(58) Field of Classification Search
CPC .............................. H04B 7/0695; H04W 4/027
See application file for complete search history.

(56) References Cited

U.S. PATENT DOCUMENTS

| | | | | |
|---|---|---|---|---|
| 9,961,564 | B2 * | 5/2018 | Oh .................. | H04B 7/0404 |
| 10,650,346 | B1 * | 5/2020 | Pesavento .......... | G06K 7/10366 |
| 2011/0148593 | A1 * | 6/2011 | Benedict ............ | G06K 7/10346 340/10.3 |
| 2013/0231115 | A1 * | 9/2013 | Lin ................... | H04W 36/0083 455/436 |
| 2013/0322251 | A1 * | 12/2013 | Kotecha ............. | H04H 20/63 370/236 |
| 2014/0070995 | A1 * | 3/2014 | Itagaki ............... | H01Q 3/26 342/372 |
| 2014/0128058 | A1 * | 5/2014 | Ji ..................... | H04W 88/08 455/423 |
| 2014/0162652 | A1 * | 6/2014 | Kang ................. | H04W 36/32 455/436 |
| 2014/0225768 | A1 * | 8/2014 | Engel ................ | H01Q 3/08 342/354 |
| 2014/0293899 | A1 * | 10/2014 | Ko .................... | H04L 5/0069 370/329 |
| 2015/0045040 | A1 * | 2/2015 | Lai ................... | H04W 36/32 455/441 |

(Continued)

*Primary Examiner* — Parth Patel

(57) ABSTRACT

A computer device, associated with a base station, may include a memory storing instructions and processor configured to execute the instructions to determine at least one of a channel quality variation or beam switching request frequency for a user equipment (UE) device communicating with the base station via wireless signals and determine a speed and direction of movement of the UE device based on the determined at least one of the channel quality variation or beam switching request frequency. The processor may be further configured to select an antenna beam pattern for the UE device based on the determined speed and direction of movement of the UE device and adjust an antenna beam associated with the UE device based on the selected antenna beam pattern.

20 Claims, 9 Drawing Sheets

(56) References Cited

U.S. PATENT DOCUMENTS

| | | | |
|---|---|---|---|
| 2015/0131750 A1* | 5/2015 | Xue | H04B 7/0456 375/267 |
| 2015/0237546 A1* | 8/2015 | Lin | H04W 36/0083 455/436 |
| 2015/0358890 A1* | 12/2015 | Xu | H04W 48/16 455/437 |
| 2016/0050094 A1* | 2/2016 | Ryu | H04L 1/0001 370/329 |
| 2016/0065248 A1* | 3/2016 | Aizawa | H04L 1/0003 455/101 |
| 2016/0227462 A1* | 8/2016 | Axmon | H04W 36/32 |
| 2016/0277130 A1* | 9/2016 | Nishioka | H04B 17/23 |
| 2016/0323075 A1* | 11/2016 | Jeong | H04L 5/0023 |
| 2017/0006539 A1* | 1/2017 | Kakishima | H04B 7/0639 |
| 2017/0188286 A1* | 6/2017 | Yonekura | H04W 36/0016 |
| 2017/0207834 A1* | 7/2017 | Kang | H04W 72/0446 |
| 2017/0317729 A1* | 11/2017 | Kobayashi | H04B 7/10 |
| 2017/0366242 A1* | 12/2017 | Lee | H04B 7/0408 |
| 2018/0017661 A1* | 1/2018 | Morioka | G01S 5/08 |
| 2018/0034611 A1* | 2/2018 | Nagaraja | H04L 5/0048 |
| 2018/0123648 A1* | 5/2018 | Nagaraja | H04B 17/15 |
| 2018/0191416 A1* | 7/2018 | Palenius | H04W 76/28 |
| 2019/0020407 A1* | 1/2019 | Gharavi | H04B 7/15528 |
| 2019/0037530 A1* | 1/2019 | Han | H04W 64/006 |
| 2019/0098520 A1* | 3/2019 | Kim | H04B 7/0617 |
| 2019/0103906 A1* | 4/2019 | Athley | H04B 7/0452 |
| 2019/0104549 A1* | 4/2019 | Deng | H04B 7/0617 |
| 2019/0115667 A1* | 4/2019 | Liang | H01Q 1/246 |
| 2019/0115971 A1* | 4/2019 | Tani | H04B 15/00 |
| 2019/0208426 A1* | 7/2019 | Roos | H04W 16/28 |
| 2019/0223174 A1* | 7/2019 | Shimizu | H04B 7/0695 |
| 2019/0246340 A1* | 8/2019 | Jung | H04W 72/046 |
| 2019/0289560 A1* | 9/2019 | Black | H01Q 3/44 |
| 2019/0297648 A1* | 9/2019 | Nagaraja | H04W 74/0841 |
| 2019/0305416 A1* | 10/2019 | Ahmed | H01P 1/182 |
| 2019/0319723 A1* | 10/2019 | Axmon | H04B 17/309 |
| 2019/0349789 A1* | 11/2019 | Zeng | H04L 1/1845 |
| 2019/0349872 A1* | 11/2019 | Harada | H04W 16/28 |
| 2019/0380132 A1* | 12/2019 | Hu | H04W 72/085 |
| 2019/0393601 A1* | 12/2019 | Logothetis | H04B 7/005 |
| 2020/0022073 A1* | 1/2020 | Yang | H04L 5/0051 |
| 2020/0022093 A1* | 1/2020 | Han | H04W 52/242 |
| 2020/0036420 A1* | 1/2020 | Kishiyama | H04B 7/088 |
| 2020/0037391 A1* | 1/2020 | Cui | H04W 76/38 |
| 2020/0059398 A1* | 2/2020 | Pan | H04W 72/0413 |
| 2020/0077320 A1* | 3/2020 | Shimoda | H04L 5/001 |
| 2020/0088867 A1* | 3/2020 | Rajendran | G01S 13/589 |
| 2020/0145079 A1* | 5/2020 | Marinier | H04B 7/0456 |
| 2020/0178134 A1* | 6/2020 | Yang | H04W 36/305 |
| 2020/0204433 A1* | 6/2020 | Nagaraja | H04B 7/0695 |
| 2020/0212988 A1* | 7/2020 | Lim | H04B 7/0617 |
| 2020/0244413 A1* | 7/2020 | Takeda | H04B 7/0695 |
| 2020/0259545 A1* | 8/2020 | Bai | H04B 7/0695 |
| 2020/0328779 A1* | 10/2020 | Sun | H04B 7/088 |
| 2020/0374960 A1* | 11/2020 | Deenoo | H04W 72/14 |

\* cited by examiner

SYSTEMS AND METHODS FOR ADAPTIVE BEAMFORMING MANAGEMENT

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services and experiencing various types of different conditions. Managing all the various types of different conditions that may arise poses various challenges.

DETAILED DESCRIPTION OF PREFERRED EMBODIMENTS

Figure 1:
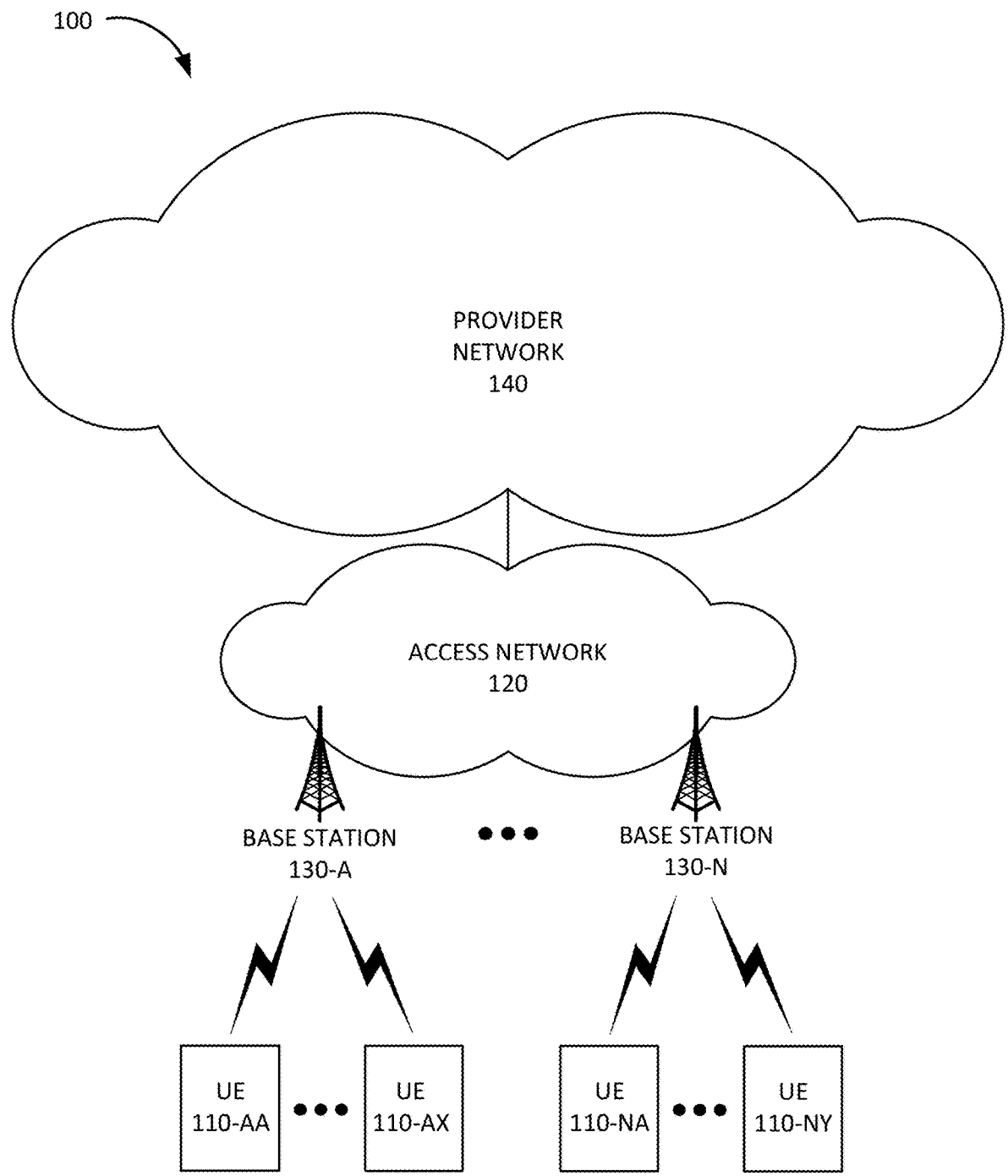
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless access networks are continuing to become more complicated is by incorporating various aspects of next generation networks, such as fifth generation (5G) mobile networks, utilizing different frequency bands and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The antenna arrays, in implementations described herein, may point to multiple users simultaneously using spatial multiplexing and/or beam forming. The use of mm-wave bands and large antenna arrays may require better directional resolution for accurate beam forming. For example, while phased arrays may perform beam forming, current settings and implementations may not be adequate for 5G beam forming. Thus, adaptive antenna arrays that can be adjusted in real time to any available setting (e.g., each antenna element may be individually set to point in a particular direction) may be used. However, determining an optimal antenna array setting may pose significant challenges.

An antenna beam may correspond to a radiation pattern focused in a particular direction. An optimum antenna array setting for a particular UE device may form an antenna beam directed toward the location of the particular UE device in such a way that the particular UE device receives signals at the maximum available signal power and/or quality, while minimizing interference to other UE devices serviced by a base station sector associated with an antenna array wireless transceiver. Thus, if the base station sector services k UE devices, the antenna array may form k simultaneous antenna beams. A particular antenna beam may be generated by logically grouping multiple antenna array elements and generating an antenna beam pattern through phase shifting applied to the antenna array elements. For each UE device, a radio communication channel is established between a 5G base station and the UE device through a beam management process in which both the base station and the UE device select the best antenna beam to use in order to maximize the received signal strength.

Different types of UE devices may experience different types of radio frequency (RF) connectivity conditions. As an example, a fixed wireless access (FWA) UE device may provide wireless connectivity to a customer premises location and may be installed at a fixed location. A radio channel between the FWA UE device and the base station may not require frequent beam adjustment. For example, if the RF channel experiences turbulent signal quality conditions that trigger beam switching, an application running on client devices being served by the FWA UE device may be tolerant of longer beam switching times due to large buffer sizes used to stabilize data streaming rates. Furthermore, higher throughputs and longer service distances are more important for FWA UE devices. Therefore, a narrow beam with high beamforming gain may be preferable for FWA UE devices.

As another example, an enhanced Mobile Broadband (eMBB) UE device, such as a user's smart phone, may not be stationary for a large portion of time. As an eMBB UE device moves around, the eMBB UE device may experience changes in the RF signal quality, triggering beam switching by the base station serving the eMBB UE device. However, frequent beam switching may result in several drawbacks, such as, for example, an increased chance of RF link failure due to failed beam pairing between a UE device and the base station, a larger beam mismatching loss due to beam management latency and accuracy, and/or an increased RF link signaling overhead used to coordinate beam switching events.

Implementations described herein relate to adaptive 5G beamforming management. The beamforming management may include adjusting the parameters of an antenna beam transmitting data to a UE device, communicating with the base station via wireless signals, based on the RF conditions associated with the UE device. For example, a base station may select a beam pattern for a UE device based on the speed and direction of movement of the UE device.

The base station may be configured to determine the channel quality variation and/or beam switching information of the UE device and determine the speed and direction of movement of the UE device based on the determined channel quality variation and/or beam switching information, such as the current antenna beam pattern, the beam switching frequency, particular antenna beams to which UE device has requested to switch to, etc. The base station may then select an antenna beam pattern for the UE device based on the determined speed and direction of movement of the UE device and adjust the antenna beam associated with the UE device based on the selected antenna beam pattern.

For example, a narrow or fine antenna beam pattern may be selected for stationary or slow moving UE devices. A narrow antenna beam may be associated with higher antenna gain and finer spatial granularity, resulting in improved RF link quality and/or higher capacity. On the other hand, a wider antenna beam pattern may be selected for UE devices moving at higher relative speeds with respect to the base station. A wider antenna beam may be associated with UE devices that are located closer to a base station and trigger more frequent beam switching. Since the RF link quality may be higher for UE devices closer to the base station, due to lower propagation loss, the reduction of antenna gain by adapting to a wider beam may not likely impact the service quality for the UE devices.

Adjusting the antenna beam associated with the UE device may include widening or narrowing/sharpening the antenna beam associated with the UE device in the direction of movement of the UE device and/or widening or narrowing/sharpening the antenna beam associated with the UE device in proportion to the speed of the UE device. For example, if a UE device is moving in a direction perpendicular to the direction of the antenna beam, or within a particular angle range of the perpendicular direction to the direction of the antenna beam, the base station may widen the antenna beam. However, if the UE device is moving in a direction parallel to the direction of the antenna beam, or within a particular number of degrees of being parallel to the direction of the antenna beam, the base station may select to narrow the antenna beam width to improve antenna gain, based on the determined direction of movement of the UE device as indicated by a very low number of beam switching events (e.g., less than a threshold) associated with the UE device. The widening or narrowing of an antenna beam may be adaptive and updated at particular intervals. As an example, if the speed of a UE device continues to increase, the antenna beam for the UE device may be widened in a series of steps and if the speed of the UE device continues to decrease, the antenna beam for the UE device may be narrowed in a series of steps.

In some implementations, the base station may track the direction of movement of the UE device and change the width of the antenna beam in particular directions in response to detecting a change in the direction of movement of the UE device. For example, the base station may determine that the UE device is moving in a first direction, select to widen the antenna beam associated with the UE device in a second direction based on determining that the UE device is moving in the first direction, determine that the UE device switches to moving in a third direction, and select to widen the antenna beam associated with the UE device in a fourth direction based on determining that the UE device is moving in the third direction. As the antenna beam is widened in the fourth direction, the antenna beam may be narrowed in the second direction (e.g., which is perpendicular to the fourth direction), in order to increase beamforming gain.

Furthermore, widening an antenna beam may result in a reduction of antenna gain for the antenna beam. Thus, the base station may allocate more power to the antenna beam, in response to widening the antenna beam. For UE devices near a base station, the RF conditions may be sufficient to support particular levels of data throughput even with the loss of antenna gain resulting from the widening of an antenna beam. For UE devices far from the base station (e.g., farther than a threshold), widening an antenna beam may result in a significant reduction in RF signal strength. However, for UE devices that are sufficiently far enough from the base station, and are moving in a direction that is perpendicular to the antenna beam direction from the base station, the rate of change of the angle between the direction of movement of the UE device and the antenna beam may be low, resulting in a low frequency of antenna beam switching. Thus, the base station may determine that the UE device is moving at a relatively low speed (e.g., based on the low rate of change of the angle between the direction of movement and the antenna beam), and may select to narrow the antenna beam to retain sufficient beamforming gain to serve the distant UE device. Thus, in some implementations, the base station may determine a distance from the base station to the UE device and may select an antenna beam pattern for the UE device based on the determined distance from the base station to the UE device. Similarly, in some implementations, if an antenna beam is narrowed, the base station may reduce the power allocated to the antenna beam in some situations.

In some implementations, the base station may also select an antenna beam pattern to be generated by the UE device when sending information to the base station. The base station may select an antenna beam pattern for the UE device antenna array based on the determined speed and direction of movement of the UE device and may instruct the UE device to adjust an antenna beam (e.g., widen or sharpen/narrow the antenna beam) generated by the UE device antenna array based on the selected antenna beam pattern for the UE device antenna array. Furthermore, in some implementations, the UE device antenna beam adaptation may be implemented solely by the UE device based on the speed and direction of the UE device determined by the UE device based on the current antenna beam pattern being used by the UE device.

If the selected antenna beam pattern does not satisfy the RF signal quality requirements, and/or if the UE device detects another antenna beam with a higher signal quality, the base station may select to transfer signals associated with the UE device to the other antenna beam. For example, the base station may determine that a signal quality associated with another antenna beam is higher than a signal quality associated with the antenna beam associated with the UE device and may transfer signals associated with the UE device to the other antenna beam, in response to determining that the signal quality associated with the other antenna beam is higher than the signal quality associated with the antenna beam associated with the UE device.

In some implementations, a beamforming adaptation may be implemented in either an analog or a digital beamforming system. Furthermore, the adaptation may be achieved in multiple stages as the speed and direction of a UE device changes. Different dimensions of an antenna beam may be adapted simultaneously to optimize the antenna beam pattern, beamforming gain, and/or RF link quality. The beam forming adaptation may be implemented for the antenna beam generated by the base station, for the antenna beam generated by the UE device, or for both the base station and UE device antenna beams, jointly or independently.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), an access network 120, and a provider network 140.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), a type of M2M communication, and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 120 may provide access to provider network 140 for UE devices 110. Access network 120 may enable UE device 110 to connect to provider network 140 for mobile telephone service, Short Message Service (SMS) message service, Multimedia Message Service (MIMS) message service, Internet access, cloud computing, and/or other types of data services.

Access network 120 may establish or may be incorporated into a packet data network connection between UE device 110 and provider network 140 via one or more Access Points (APs). For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140, such as, for example, Data over Non-Access Stratum (DoNAS).

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as 5G New Radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UE devices 110. For example, base station 130-A may service UE devices 110-AA to 110-AX, etc., and base station 130-N may service UE devices 110-NA to 110-NY. In other words, UE devices 110-AA to 110-AX may be located within the geographic area serviced by base station 130-A, and other UE devices 110 may be serviced by another base station 130. Base station 130 may include a 5G base station (e.g., a gNodeB) that includes one or more RF transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 130 may also include a 4G base station (e.g., an eNodeB).

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
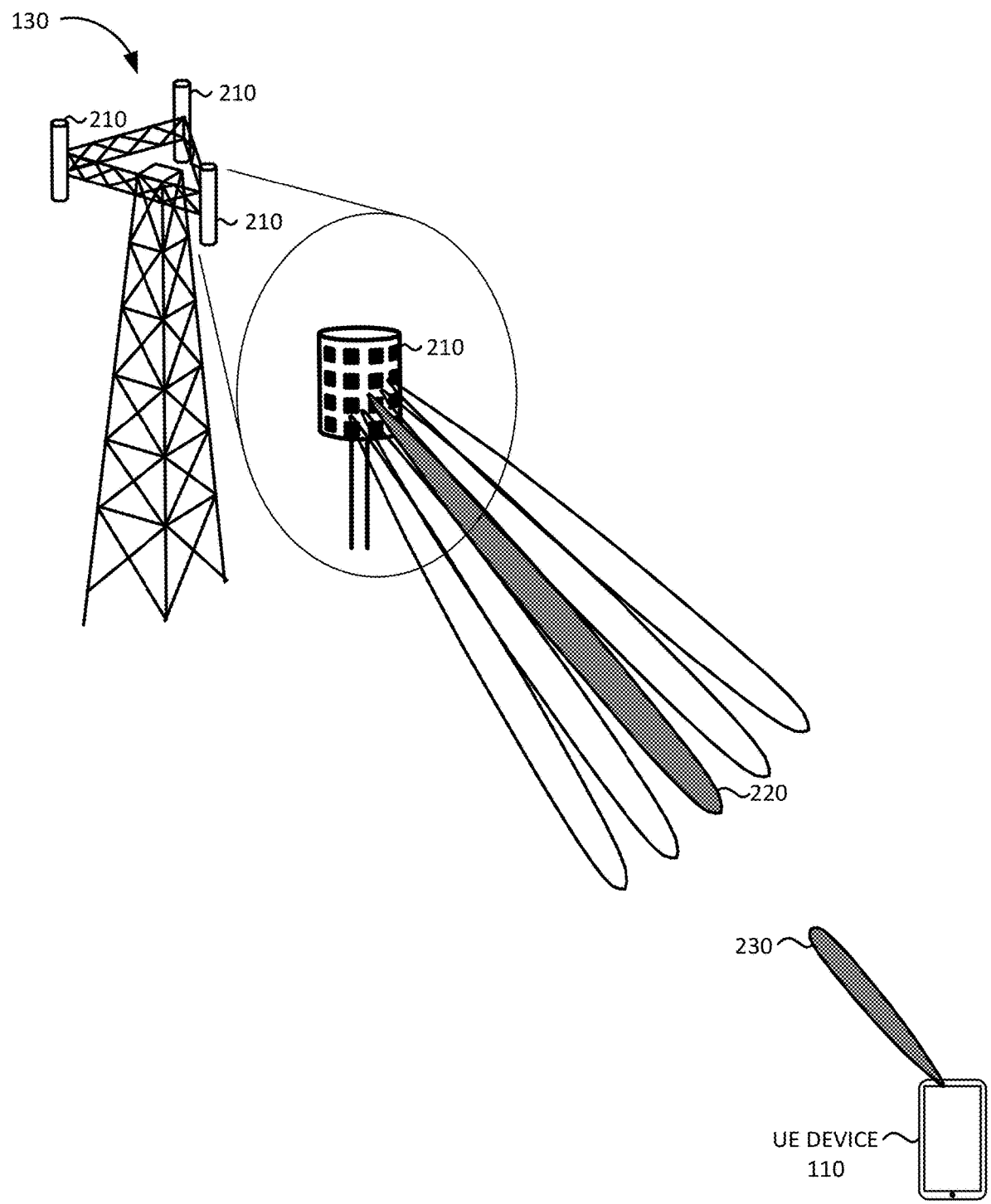
FIG. 2 is a diagram illustrating exemplary components of the base station of FIG. 1 according to an implementation described herein.

FIG. 2 illustrates exemplary components of base station 130 according to an implementation described herein. As shown in FIG. 2, base station 130, which covers three 120° sectors, may include one or more antenna arrays 210. Antenna array 210 may include an array of controllable antenna elements configured to send and receive 5G NR wireless signals. The antenna elements may be digitally controllable to electronically tilt or steer an antenna beam in a vertical direction and/or horizontal direction. In some implementations, the antenna elements may additionally be controllable via mechanical tilting or steering using one or more actuators associated with each antenna element. The base station sector associated with antenna array 210 may serve k UE devices 110 and antenna array 210 may simultaneously generate k antenna beams.

A particular antenna beam 220 of the generated k antenna beams may serve one or more UE devices 110. Antenna beam 220 may extend in a direction toward UE device 110 being served by antenna beam 220. Antenna beam 220 may not point exactly in the direction of the location of UE device 110, but may point in a direction determined to result in the best possible signal quality (e.g., received power) perceived by UE device 110. UE device 110 may also include an antenna array and may be configured to generate an antenna beam 230 in the direction of base station 130 (e.g., in a direction determined to result in the best possible signal quality perceived by base station 130).

Although FIG. 2 shows exemplary components of base station 130, in other implementations, base station 130 may include fewer components, different components, differently arranged components, or additional functional components than depicted in FIG. 2. Additionally, or alternatively, one or more components of base station 130 may perform functions described as being performed by one or more other components of base station 130.

Figure 3:
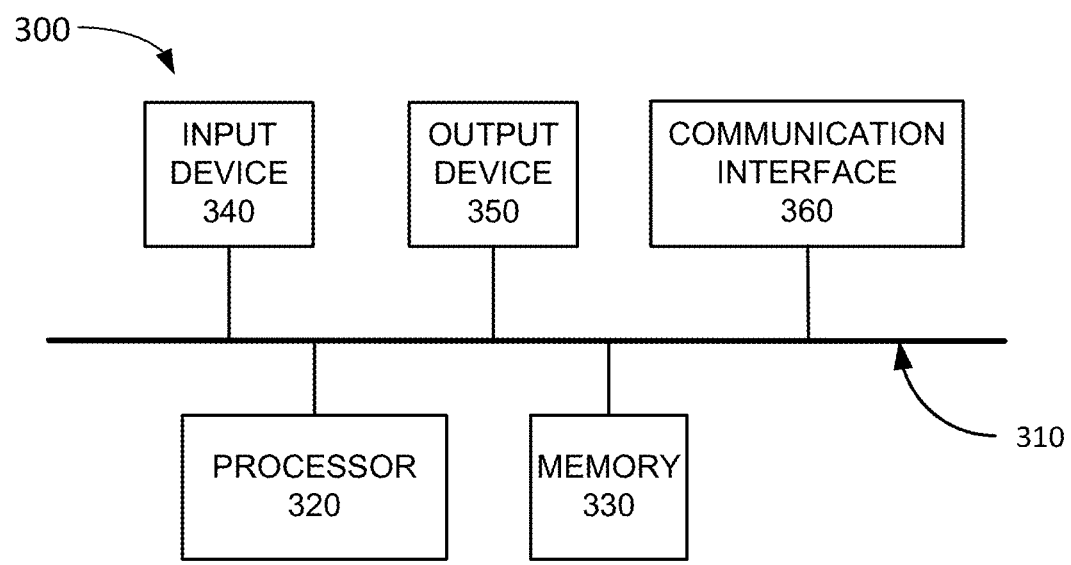
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. Base station 130 and/or UE device 110 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to beamforming management. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
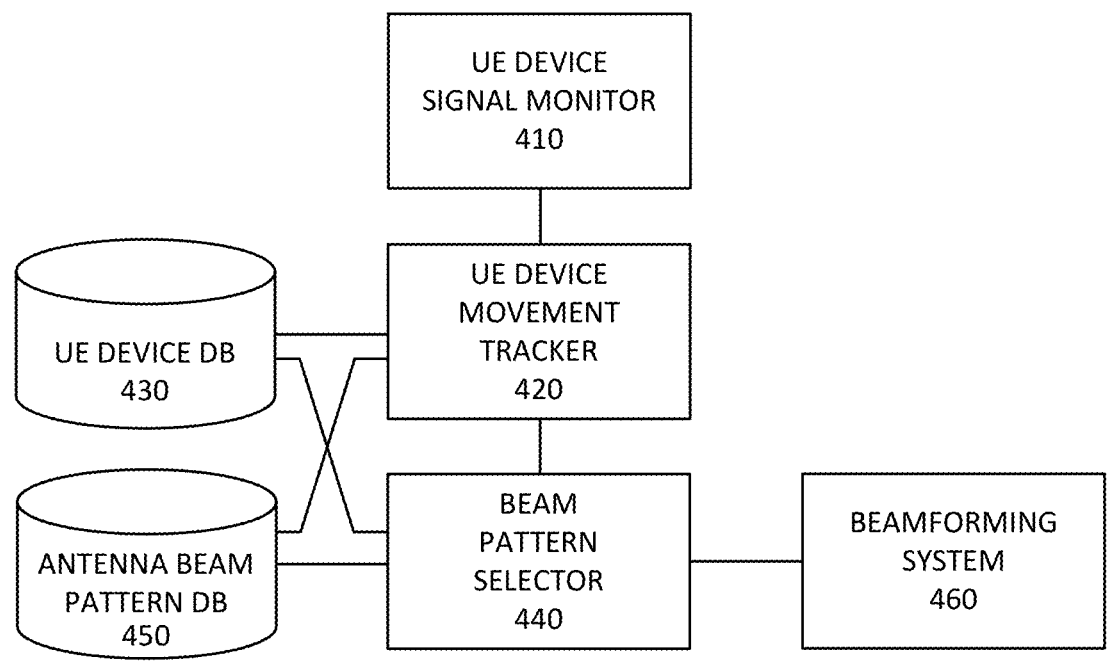
FIG. 4 is a diagram illustrating exemplary functional components of the base station of FIG. 1 according to an implementation described herein.

FIG. 4 is a diagram illustrating exemplary functional components of base station 130. The functional components of base station 130 may be implemented, for example, via processor 320 executing instructions from memory 330. Alternatively, some or all of the functional components of base station 130 may be implemented via hard-wired circuitry. As shown in FIG. 4, base station 130 may include a UE device signal monitor 410, a UE device movement tracker 420, a UE device database (DB) 430, a beam pattern selector 440, an antenna beam pattern DB 450, and a beamforming system 460.

UE device signal monitor 410 may monitor the signal quality associated with UE devices 110, the associated antenna beams, particular antenna beams to which particular UE devices have requested to switch, and/or the beam switching request frequency. For example, UE device signal monitor 410 may, for a particular UE device 110 being served by base station 130, a variation in the channel quality measured by the particular UE device 110. The channel quality may be measured, for example, using a channel quality indicator (CQI) value, a signal to noise ratio (SNR) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or using another measure of signal strength or quality. Furthermore, UE device signal monitor 410 may monitor the beam switching request frequency associated with the particular UE device 110. For example, each time the particular UE device 110 detects a neighboring antenna beam that has a higher signal quality than the antenna beam currently being used by the particular UE device 110 to receive signals from base station 130, the particular UE device 110 may send a request to base station 130 to switch to the neighboring beam. Base station 130 may or may not act on the beam switching request.

UE device movement tracker 420 may track the movement of UE devices 110. For example, UE device movement tracker 420 may determine the speed of movement for a particular UE device 110, the direction of movement for the particular UE device 110, and/or the distance of the particular UE device 110 from base station 130 based on information obtained from UE device signal monitor 410 and based on the currently used antenna beam, antenna beam signal strengths reported by the particular UE device 110, and/or the current antenna beam pattern being used by the particular UE device 110. As an example, base station 130 may build up a map of signal strength values in the service area of base station 130 for particular time periods (e.g., particular times of day, days of the week, etc.) and may determine the speed, direction, and/or distance of the particular UE device 110 based on the map of signal strength values. As another example, base station 130 may determine the area covered by each generated antenna beam based on the direction and width of each generated antenna beam and may determine the speed, direction, and/or distance of the particular UE device 110 from base station 130 based on the signal strengths of particular antenna beams measured by the particular UE device 110. Additionally, or alternatively, in some implementations, the speed, direction, and/or distance of the particular UE device 110 from base station 130 may be determined using GPS information obtained from the particular UE device 110. UE device movement tracker 420 may use the current antenna pattern selected for UE device 110 to determine the movement of UE device 110.

UE device DB 430 may store information relating to particular UE devices 110. Exemplary information that may be stored in UE device DB 430 is described below with reference to FIG. 5. Beam pattern selector 440 may select a particular beam pattern for antenna array 210 for an antenna beam associated with a particular UE device 110 based on information stored in UE device DB 430 and based on information stored in antenna beam pattern DB 450. Antenna beam pattern DB 450 may store information relating to particular antenna beam patterns. A particular antenna beam pattern may be defined by a set of parameters that specify the width of an antenna beam in particular directions (e.g., a horizontal width, a vertical width, etc.). Additionally, the particular antenna beam pattern may specify a particular power level setting. Furthermore, each antenna beam pattern may be associated with a particular range of UE device 110 speeds, a particular range of UE device 110 directions, and/or a particular range of UE device 110 distances from base station 130. Thus, an antenna beam associated with UE device 110 may be widened or narrowed in the direction of movement of UE device 110 and/or widened or narrowed in proportion to the speed of UE device 110. In some implementations, more power may be allocated to the antenna beam in response to widening the antenna beam or power may be reduced if the antenna beam is narrowed.

Furthermore, beam pattern selector 440 may select a particular beam pattern for an antenna beam generated by the particular UE device 110 based on information stored in UE device DB 430 and based on information stored in antenna beam pattern DB 450 and may send instructions to UE device 110 to update the antenna beam pattern. Beam pattern selector 440 may continue to adaptively adjust the antenna beam pattern for the antenna beam generated by UE device 110 by sending instructions to UE device 110 at particular intervals.

Beamforming system 460 may perform beamforming on antenna array 210 to generate an antenna beam based on a particular antenna beam pattern. For example, beamforming system 460 may adjust the phase of particular antenna elements in a particular sequence to generate the particular antenna beam pattern, and/or determine the size and shape of the subset of antenna array 210 required to generate the particular antenna beam pattern. Beam pattern selector 440 may continue to select different antenna beam patterns based on the changing speed and direction of movement, and/or distance from base station 130, of UE device 110 and beamforming system 460 may adjust the antenna beam, generated by antenna array 210 and associated with UE device 110, based on the selected antenna beam patterns. For example, beamforming system 460 may widen the antenna beam associated with UE device 110 in response to UE device 110 starting to move at a higher speed (e.g., a speed higher than a particular speed threshold) or narrow the antenna beam associated with the UE device 110 in response to UE device 110 slowing down.

Although FIG. 4 shows exemplary functional components of base station 130, in other implementations, base station 130 may include fewer functional components, different functional components, differently arranged functional components, or additional functional components than depicted in FIG. 4. Additionally, or alternatively, one or more functional components of base station 130 may perform functions described as being performed by one or more other functional components of base station 130.

Figure 5:
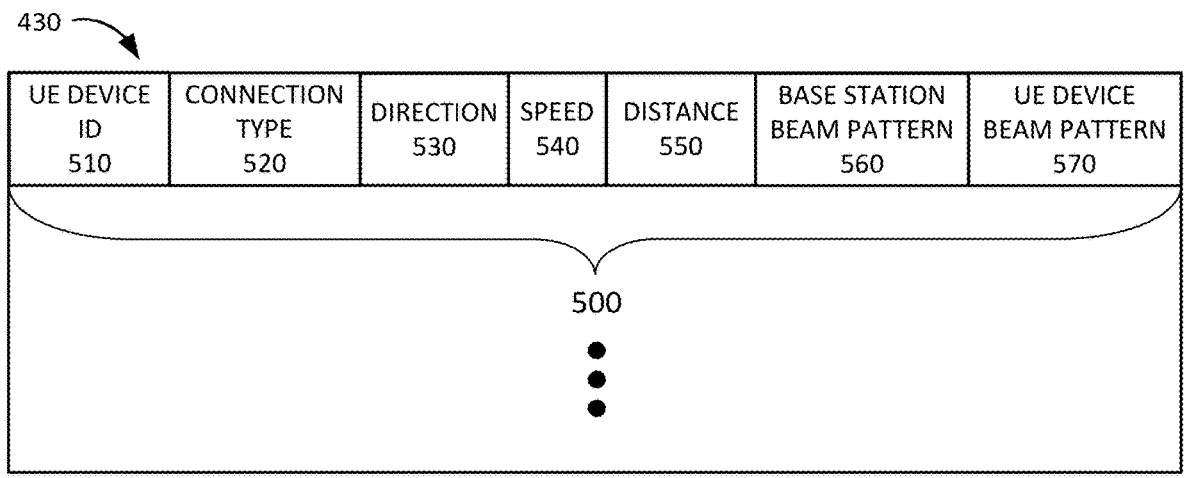
FIG. 5 is a diagram illustrating exemplary components of the user equipment (UE) device database of FIG. 4 according to an implementation described herein.

FIG. 5 is a diagram illustrating exemplary information stored in UE device DB 430 according to an implementation described herein. As shown in FIG. 5, UE device DB 430 may include one or more UE device records 500. Each UE device record 500 may store information relating to a particular UE device 110. UE device record 500 may include a UE device identifier (ID) field 510, a connection type field 520, a direction field 530, a speed field 540, a distance field 550, a base station beam pattern field 560, and a UE device beam pattern field 570.

UE device ID field 510 may store one or more IDs associated with a particular UE device 110. For example, UE device field 510 my store a Mobile Station International Subscriber Directory Number (MSISDN), an International Mobile Subscriber Identity (IMSI) number, a Mobile Directory Number (MDN), an International Mobile Equipment Identity (IMEI), a Media Access Control (MAC) address, an Internet Protocol (IP) address, a Session Initiation Protocol (SIP) address, and/or by another type of identifier associated with the particular UE device 110.

Connection type field 520 may store information identifying a connection type associated with the particular UE device. For example, connection type field 520 may identify a particular Quality of Service (QoS) class associated with a connection, a particular service requirement associated with the connection (e.g., a latency requirement, a throughput requirement, etc.), and/or other types of information identifying a type of connection. Different types of connections may be treated differently with respect to selecting an antenna beam pattern. For example, in some implementations, if the particular UE device 110 includes a high throughput requirement connection, base station 130 may select to not widen a beam in order to maintain a higher throughput.

Direction field 530 may store information identifying a direction of movement associated with the particular UE device 110. The direction of movement may be identified based on a compass azimuth direction, based on an angle with respect to a centerline of an antenna beam, and/or may be identified in other ways. Speed field 540 may store information identifying the speed of movement for the particular UE device 110. Distance field 550 may store information identifying the distance of the particular UE device 110 from base station 130.

Base station beam pattern field 560 may store a particular beam pattern for antenna array 210 of base station 130, that was selected from antenna beam pattern DB 450 for the particular UE device 110. UE device beam pattern field 570 may store a particular beam pattern for an antenna array of UE device 110 that was selected from antenna beam pattern DB 450 for the particular UE device 110.

Although FIG. 5 shows exemplary components of UE device DB 430, in other implementations, UE device DB 430 may include fewer components, different components, additional components, or differently arranged components than depicted in FIG. 5.

Figure 6:
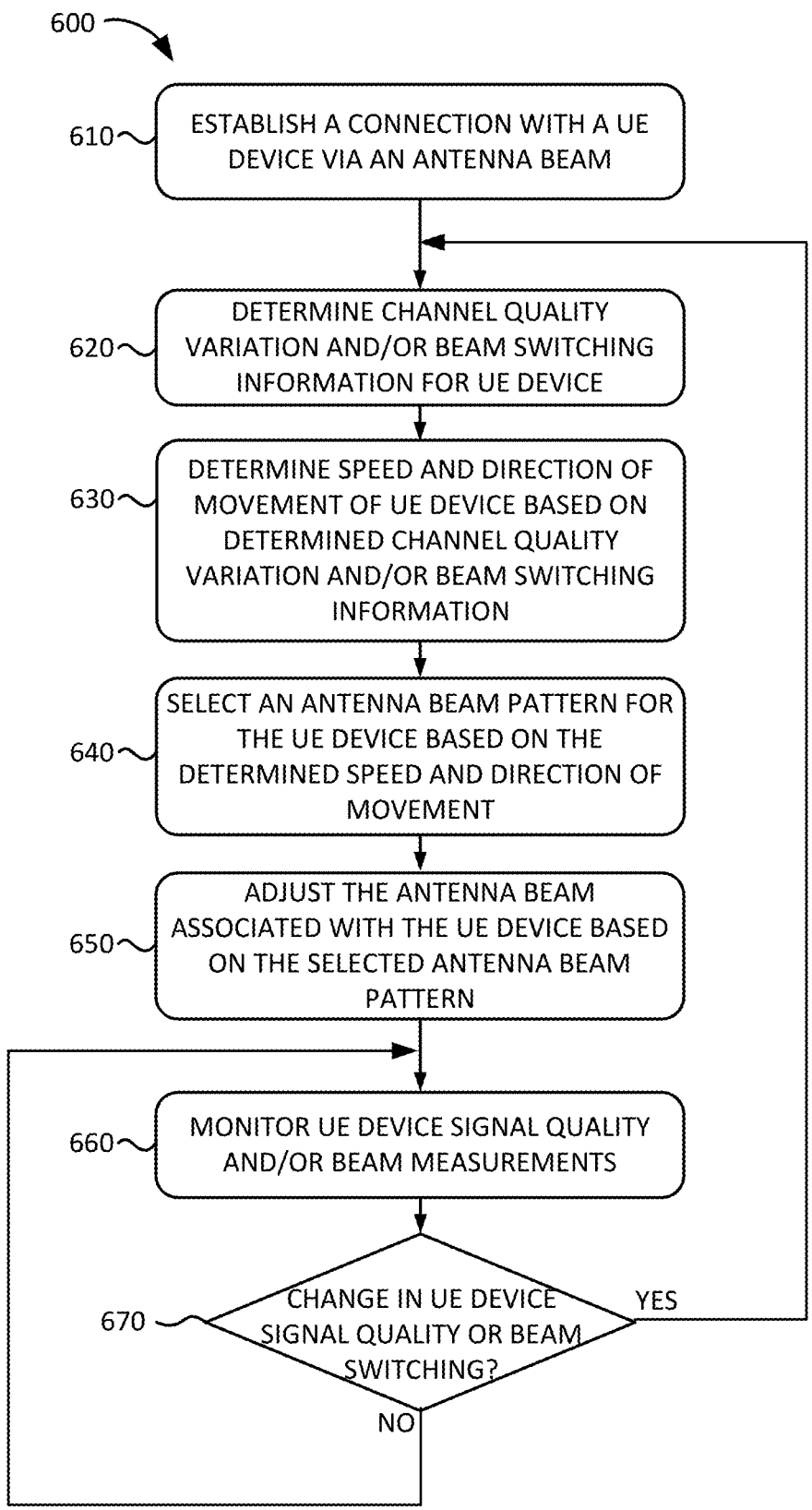
FIG. 6 is a flowchart of a process for adaptive beamforming according to an implementation described herein.

FIG. 6 is a flowchart 600 of a process for adaptive beamforming according to an implementation described herein. In some implementations, the process of FIG. 6 may be performed by base station 130. In other implementations, some or all of the process of FIG. 6 may be performed by another device or a group of devices separate from base station 130.

The process of flowchart 600 may include establishing a connection with UE device 110 via an antenna beam (block 610). For example, after UE device 110 attaches to access network 120, base station 130 may assign UE device 110 to a particular antenna beam 130 or may generate a new antenna beam via antenna beam array 210 for UE device 110 based on the location of UE device 110.

A channel quality variation and/or beam switching information for UE device 110 may be determined (block 620). For example, base station 130 may monitor one or more signal quality parameters for UE device 110, such as a CQI value, an SNR value, an SINR value, a BLER value, an RSSI value, an RSRQ value, an RSRP value, and/or another type of signal quality measure value. Additionally, or alternatively, base station 130 may monitor the number of beam switching requests received from UE device 110 within a particular time period.

A speed and direction of movement for UE device 110 may be determined based on the determined channel quality variation and/or beam switching information (block 630). For example, base station 130 may continuously or periodically determine the speed of movement for UE device 110, the direction of movement for UE device 110, and/or the distance of UE device 110 from base station 130 based on the determined channel quality variation and/or beam switching information, as well as the current antenna beam pattern associated with UE device 110. The beam switching information may include information identifying the beam switching frequency associated with UE device, the particular antenna beams to which UE device 110 requested to switch and/or which UE device 110 detected as having a stronger signal, and/or a current antenna beam pattern selected for UE device 110 by base station 130.

In some implementation, base station 130 may use a map of previously determined signal strength values to estimate the location of UE device 110. In other implementations, base station 130 may calculate the rate of change of the angle between the direction of movement of UE device 110 and a computed centerline of the antenna beam associated with UE device 110. In yet other implementations, base station 130 may determine the area covered by each generated antenna beam based on the direction and width of each generated antenna beam and may determine the speed, direction, and/or distance of UE device 110 based on the signal strengths of particular antenna beams measured by UE device 110.

An antenna beam pattern for UE device 110 may be selected based on the determined speed and direction of movement (block 640) and an antenna beam associated with UE device 110 may be adjusted based on the selected antenna beam pattern (block 650). For example, base station 130 may access antenna beam pattern DB 450 and select a particular antenna beam pattern based on the speed and direction of movement, and/or the distance from base station 130, for UE device 110. The selected antenna beam pattern may widen the antenna beam associated with UE device 110 in a first direction and/or may sharpen/narrow the antenna beam associated with UE device 110 in a second direction. Furthermore, the selected antenna beam pattern may specify a particular gain and/or power level for the antenna beam. Base station 130 may then perform beamforming on antenna array 210 to generate an antenna beam based on the selected antenna beam pattern. Thus, an antenna beam associated with UE device 110 may be widened in the direction of movement of UE device 110, widened in proportion to the speed of UE device 110, and/or more power may be allocated to the antenna beam in response to widening the antenna beam.

Furthermore, base station 130 may select an antenna beam pattern for the antenna array included in UE device 110, based on the speed and direction of movement, and/or the distance from base station 130, for UE device 110, and may instruct UE device 110 to adjust the antenna beam generated by the antenna array included in UE device 110 when sending signals to base station 130.

The signal quality and/or beam switching information for UE device 110 may be monitored (block 660) and a determination may be made as to whether there is a change in the signal quality and/or beam switching information for UE device 110 (block 670). For example, base station 130 may continue to continuously or periodically monitor the signal quality and/or beam measurements associated with UE device 110 and use the signal quality and/or beam measurements to speed and direction of movement of UE device 110, and/or distance from UE device 110 to base station 130. Base station 130 may select a different antenna beam pattern if the speed and direction of movement of UE device 110, and/or distance from UE device 110 to base station 130, changes (e.g., changes more than a threshold amount). Furthermore, base station 130 may also select a different antenna beam pattern for the antenna array included in UE device 110 and may instruct UE device 110 to adjust its antenna beam pattern. If base station 130 determines that a signal quality associated with another antenna beam is higher than a signal quality associated with the antenna beam associated with the UE device 110 by at least a threshold amount, base station 130 may select to transfer signals associated with UE device 110 to the other antenna beam in response.

If the change in the signal quality and/or beam switching information for UE device 110 is within a threshold amount (block 670—NO), processing may return to block 660 to continue to monitor the signal quality for UE device 110. If there is a change in the signal quality and/or beam switching information for UE device 110 greater than the threshold amount (block 670—YES), processing may return to block 620 to determine the channel quality variation and/or beam switching frequency for UE device 110, and modify the antenna beam or select a new antenna beam, if necessary to meet the service requirements associated with UE device 110.

Figure 7:
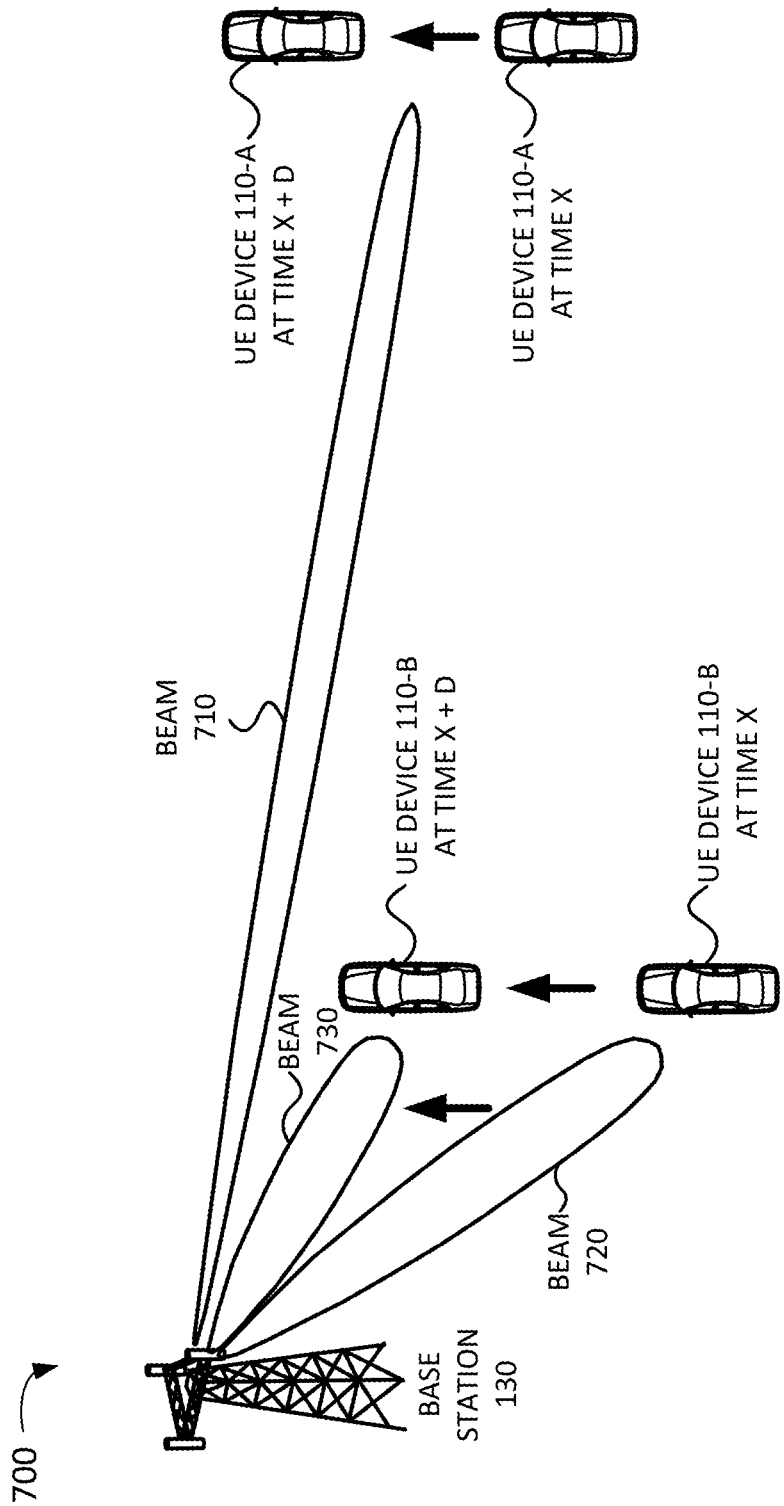
FIG. 7 is a diagram of an exemplary system according to an implementation described herein.

FIG. 7 is a diagram of an exemplary system 700 according to an implementation described herein. As shown in FIG. 7, system 700 may include base station 130, UE device 110-A, and UE device 110-B. UE device 110-A may be located relatively far away (e.g., further than a first distance threshold) from base station 130 and UE device 110-B may be located relatively close (e.g., closer than a second distance threshold) to base station 130. Assume UE devices 110-A and 110-B are moving at similar speeds (e.g., within a particular range of speeds). However, since the relative speed of UE device 110-B with respect to base station 130 is faster (e.g., based on the rate of change of the angle between the direction of movement of UE device 110-B and antenna beam 720), antenna beam 720 may be wider than antenna beam 710.

UE device 110-A may move a particular distance between time x and time x+d. Because UE device 110-A is far away from base station 130, during the time period from x to x+d, the rate of change of the angle between the direction of movement of UE device 110-A and antenna beam 710 serving UE device 110-A may be low (e.g., lower than an angle change threshold). Thus, UE device 110-A may not experience a significant change in the detected signal quality of signals received via antenna beam 710. Moreover, UE device 110-A may not send a high number of antenna beam switching requests (e.g., lower than a request threshold) to base station 130. Thus, antenna beam 710 may not need to be widened, and transfer to a new antenna beam may not be needed.

In contrast, because UE device 110-B is close to base station 130, during the time period from x to x+d, the rate of change of the angle between the direction of movement of UE device 110-B and antenna beam 720 serving UE device 110-B may be high (e.g., higher than an angle change threshold). Thus, UE device 110-B may experience a significant change in the detected signal quality of signals received via antenna beam 720. Additionally, or alternatively, UE device 110-B may send a high number of antenna beam switching requests (e.g., higher than a request threshold) to base station 130. Thus, base station 130 may, in response, select to widen antenna beam 720.

Figure 8:
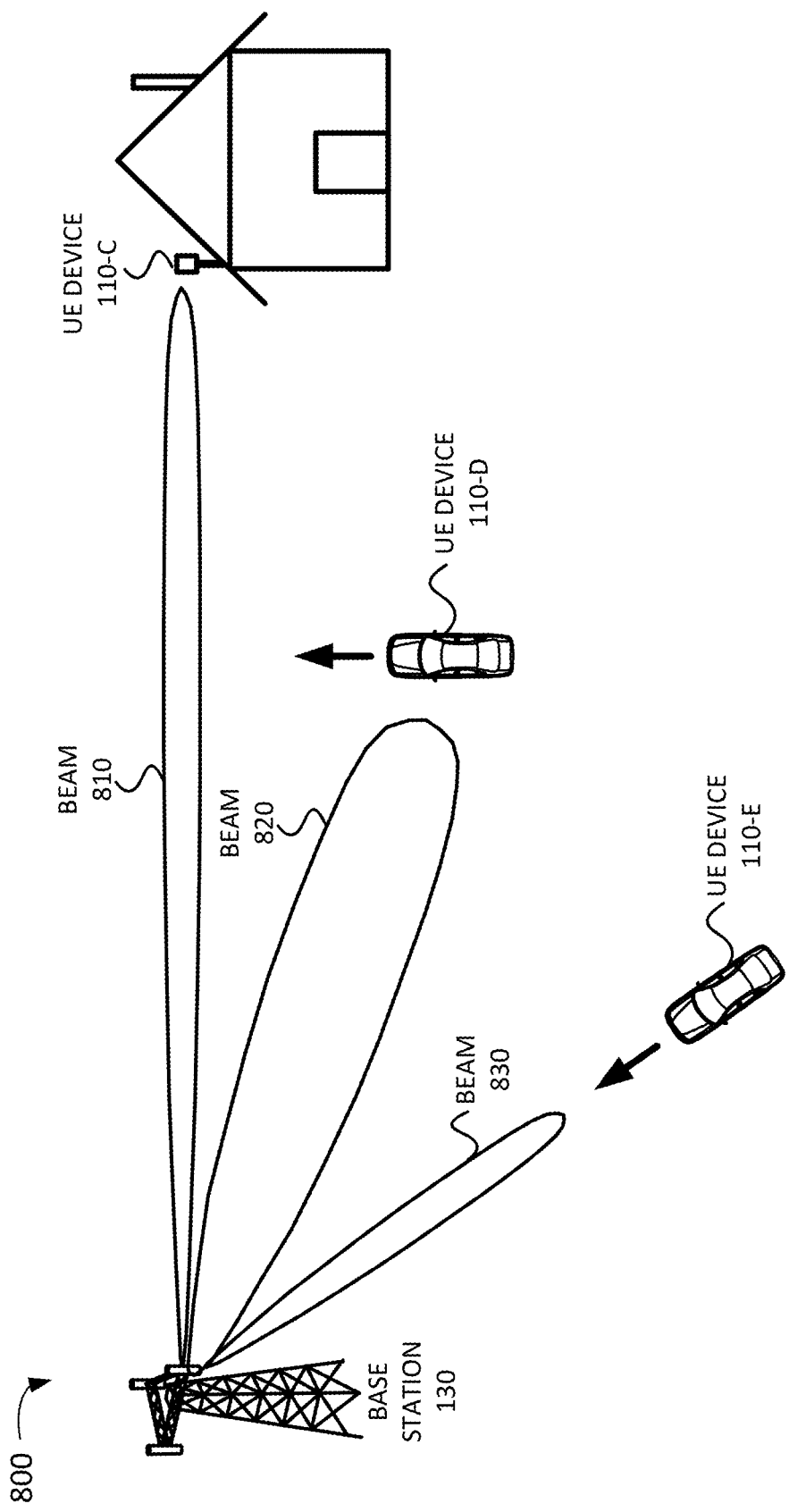
FIG. 8 is a diagram of another exemplary system according to an implementation described herein.

FIG. 8 is a diagram of another exemplary system 800 according to an implementation described herein. As shown in FIG. 8, system 800 may include base station 130, UE device 110-C, UE device 110-D, and UE device 110-E. UE device 110-C may correspond to an FWA device that is installed in a fixed location (e.g., on the roof of a house) and that remains stationary. Therefore, antenna beam 810 serving UE device 110-C may correspond to a narrow, high gain antenna beam that does not need to be adjusted.

UE device 110-D may correspond to a device in a vehicle that is moving in a direction perpendicular to beam 820 serving UE device 110-D. As a result, the rate of change of the angle between the direction of movement of UE device 110-D and antenna beam 820 serving UE device 110-D may be high (e.g., higher than an angle change threshold). Thus, UE device 110-D may experience a significant change in the detected signal quality of signals received via antenna beam 820. Additionally, or alternatively, UE device 110-D may send a high number of antenna beam switching requests (e.g., higher than a request threshold) to base station 130. Base station 130 may, in response, select to widen antenna beam 820.

UE device 110-E may correspond to a device in a vehicle that is moving in a direction that is substantially parallel with antenna beam 830 (i.e., toward base station 130 (or away from base station 130 in other cases)). As a result, there may be insignificant rate of change of the angle between the direction of movement of UE device 110-E and antenna beam 830. UE device 110-E may experience a change in the signal quality, but the change may be toward a higher signal quality. Furthermore, UE device 110-E may not generate any beam switching requests, because UE device 110-E may not detect any antenna beams with a higher signal quality than antenna beam 830. Thus, antenna beam 830 may not need to be widened and may instead be narrowed/sharpened to improve beamforming antenna gain.

Figure 9:
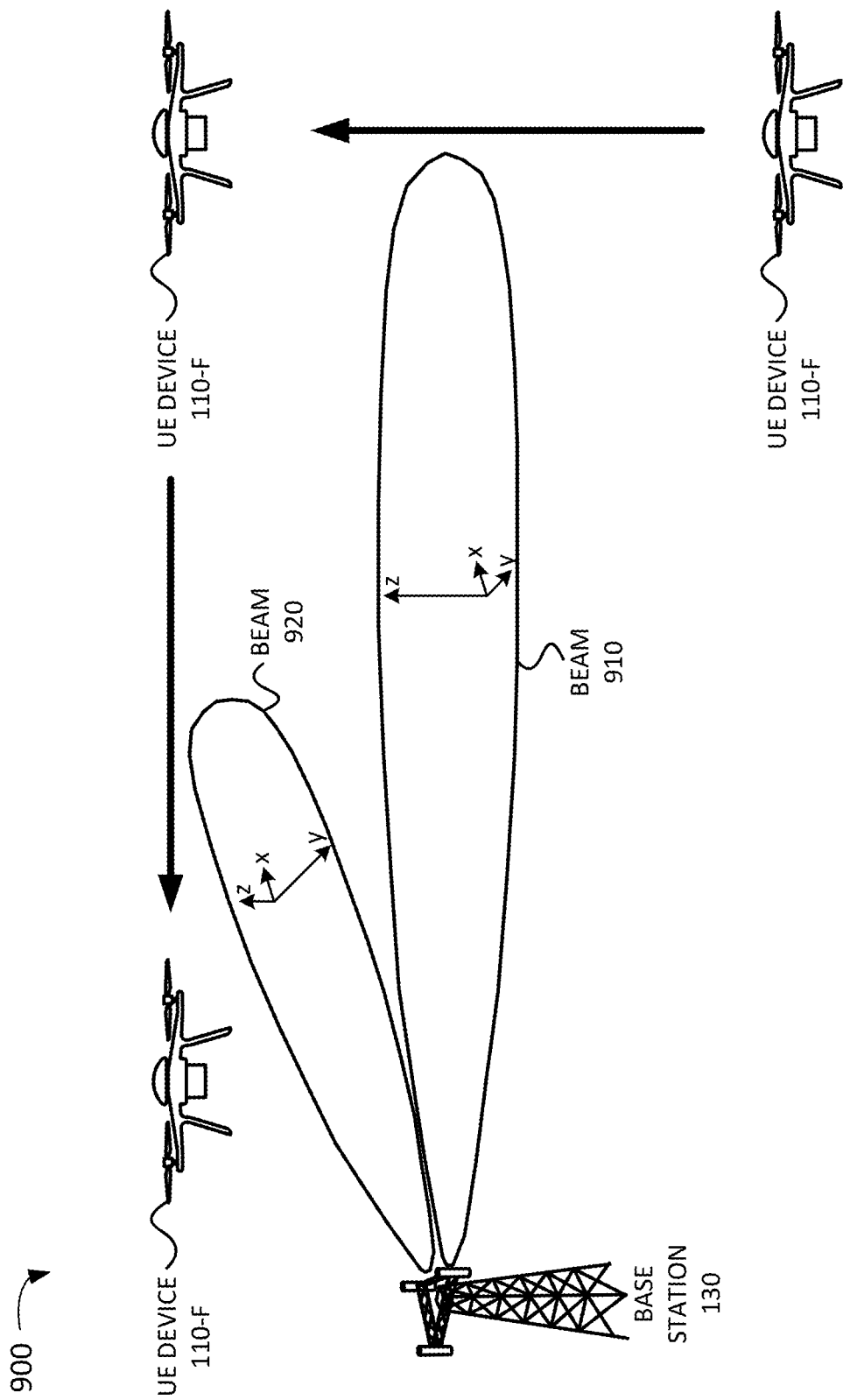
FIG. 9 is a diagram of yet another exemplary system according to an implementation described herein.

FIG. 9 is a diagram of yet another exemplary system 900 according to an implementation described herein. As shown in FIG. 9, system 900 may include base station 130 and UE device 110-F. UE device 110-F may include an autonomous/semi-autonomous drone configured to deliver a payload (e.g., a package) to a location. Base station 130 may adjust an antenna beam serving UE device 110-F based on the direction in which UE device 110-F is moving and may adjust the antenna beam if UE device 110-F changes directions. For example, UE device 110-F may first move in a vertical direction in order to gain altitude. In response, base station 130 may widen antenna beam 910 serving UE device 110-F in a first direction (e.g., along the z axis as shown in FIG. 9). At a later time, UE device 110-F may maintain an elevation and may start moving horizontally. In response, UE device 110-F may eliminate the widening or reduce the width of antenna beam 910 along the first direction and may widen antenna beam 910 along a second direction (e.g., along the y axis as shown in FIG. 9). As another example, if UE device 110-F later speeds up, base station 130 may widen antenna beam 910 in response to the higher movement speed of UE device 110-F (not shown in FIG. 9). Thus, base station 130 may continuously adapt an antenna beam based on the speed and/or direction of movement of UE device 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a base station, a beam switching request frequency for a user equipment (UE) device communicating with the base station via wireless signals based on requests sent to the base station by the UE device to switch antenna beams;
   determining, by the base station, a speed and direction of movement of the UE device with respect to the base station, based on the determined beam switching request frequency;
   selecting, by the base station, an antenna beam pattern to be generated by the base station toward the UE device based on the determined speed and direction of movement of the UE device; and
   adjusting, by the base station, an antenna beam associated with the UE device based on the selected antenna beam pattern.

2. The method of claim 1, wherein adjusting the antenna beam associated with the UE device includes:
   widening the antenna beam associated with the UE device in the direction of movement of the UE device.

3. The method of claim 1, wherein adjusting the antenna beam associated with the UE device includes:
   widening the antenna beam associated with the UE device in proportion to the speed of the UE device.

4. The method of claim 1, wherein adjusting the antenna beam associated with the UE device includes:
   widening or narrowing the antenna beam associated with the UE device; and
   allocating more power to the antenna beam, in response to widening or narrowing the antenna beam.

5. The method of claim 1, further comprising:
selecting another antenna beam pattern for a UE device antenna array based on the determined speed and direction of movement of the UE device; and
instructing the UE device to adjust an antenna beam generated by the UE device antenna array based on the selected other antenna beam pattern for the UE device antenna array.

6. The method of claim 1, wherein selecting the antenna beam pattern for the UE device is further based on determining a distance from the base station to the UE device.

7. The method of claim 1, wherein selecting the antenna beam pattern for the UE device includes:
determining that that the UE device is moving in a direction parallel to the antenna beam associated with the UE device; and
narrowing a width of the antenna beam associated with the UE device based on determining that the UE device is moving in the direction parallel to the antenna beam associated with the UE device.

8. The method of claim 1, wherein selecting the antenna beam pattern for the UE device includes:
determining that the UE device is moving in a first direction;
selecting to widen the antenna beam associated with the UE device in a second direction based on determining that the UE device is moving in the first direction;
determining that the UE device switches to moving in a third direction; and
selecting to widen the antenna beam associated with the UE device in a fourth direction based on determining that the UE device is moving in the third direction.

9. The method of claim 1, further comprising:
determining that a signal quality associated with another antenna beam is higher than a signal quality associated with the antenna beam associated with the UE device; and
transferring signals associated with the UE device to the other antenna beam, in response to determining that the signal quality associated with the other antenna beam is higher than the signal quality associated with the antenna beam associated with the UE device.

10. A device, associated with a base station, comprising:
a memory for storing instructions; and
a processor configured to execute the instructions to:
determine a beam switching request frequency for a user equipment (UE) device communicating with the base station via wireless signals based on requests sent to the base station by the UE device to switch antenna beams;
determine a speed and direction of movement of the UE device with respect to the base station, based on the determined beam switching request frequency;
select an antenna beam pattern to be generated by the base station toward the UE device based on the determined speed and direction of movement of the UE device; and
adjust an antenna beam associated with the UE device based on the selected antenna beam pattern.

11. The device of claim 10, wherein, when adjusting the antenna beam associated with the UE device, the processor is further configured to:
widen or narrow the antenna beam associated with the UE device in the direction of movement of the UE device.

12. The device of claim 10, wherein, when adjusting the antenna beam associated with the UE device, the processor is further configured to:
widen or narrow the antenna beam associated with the UE device in proportion to the speed of the UE device.

13. The device of claim 10, wherein, when adjusting the antenna beam associated with the UE device, the processor is further configured to:
widen or narrow the antenna beam associated with the UE device; and
allocate more power to the antenna beam, in response to widening or narrowing the antenna beam.

14. The device of claim 10, wherein the processor is further configured to:
select another antenna beam pattern for the UE device based on the determined speed and direction of movement of the UE device; and
instruct the UE device to adjust an antenna beam generated by the UE device based on the selected other antenna beam pattern for the UE device.

15. The device of claim 10, wherein the processor is further configured to:
determine a distance from the base station to the UE device; and
wherein, when selecting the antenna beam pattern for the UE device, the processor is further configured to:
select the antenna beam pattern for the UE device based on the determined distance from the base station to the UE device.

16. The device of claim 10, wherein, when selecting the antenna beam pattern for the UE device, the processor is further configured to:
determine that that the UE device is moving in a direction parallel to the antenna beam associated with the UE device; and
narrow a width of the antenna beam associated with the UE device based on determining that the UE device is moving in the direction parallel to the antenna beam associated with the UE device.

17. The device of claim 10, wherein, when selecting the antenna beam pattern for the UE device, the processor is further configured to:
determine that the UE device is moving in a first direction;
select to widen the antenna beam associated with the UE device in a second direction based on determining that the UE device is moving in the first direction;
determine that the UE device switches to moving in a third direction; and
select to widen the antenna beam associated with the UE device in a fourth direction based on determining that the UE device is moving in the third direction.

18. The device of claim 10, wherein the processor is further configured to:
determine that a signal quality associated with another antenna beam is higher than a signal quality associated with the antenna beam associated with the UE device; and
transfer signals associated with the UE device to the other antenna beam, in response to determining that the signal quality associated with the other antenna beam is higher than the signal quality associated with the antenna beam associated with the UE device.

19. A system comprising:
a base station comprising:
an antenna array configured to generate a plurality of antenna beams; and
a computer device configured to:
determine a beam switching request frequency for a user equipment (UE) device communicating with the base station via wireless signals based on requests sent to the base station by the UE device to switch antenna beams;

determine a speed and direction of movement of the UE device with respect to the base station, based on the determined beam switching request frequency;

select an antenna beam pattern to be generated by the base station toward the UE device based on the determined speed and direction of movement of the UE device; and control the antenna array to adjust an antenna beam associated with the UE device based on the selected antenna beam pattern.

20. The system of claim 19, wherein, when controlling the antenna array to adjust an antenna beam associated with the UE device based on the selected antenna beam pattern, the computer device is further configured to at least one of:

widen the antenna beam associated with the UE device in the direction of movement of the UE device;

widen the antenna beam associated with the UE device in proportion to the speed of the UE device; or widen the antenna beam associated with the UE device and allocate more power to the antenna beam, in response to widening the antenna beam.

\* \* \* \* \*